Figure 1:
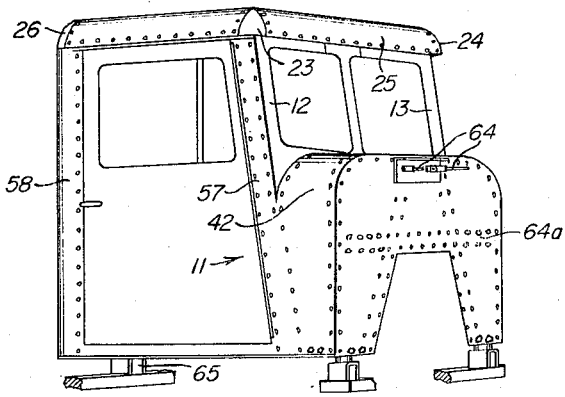

Oct. 18, 1966  G. E. HAFER ETAL  3,279,843
TRUCK CAB CONSTRUCTION

Filed June 18, 1964  2 Sheets-Sheet 1

INVENTORS
GEORGE E. HAFER
CHARLES S. WILLIS
BY Mallinckrodt and
Mallinckrodt
ATTORNEYS Oct. 18, 1966  G. E. HAFER ETAL  3,279,843
TRUCK CAB CONSTRUCTION
Filed June 18, 1964  2 Sheets-Sheet 2
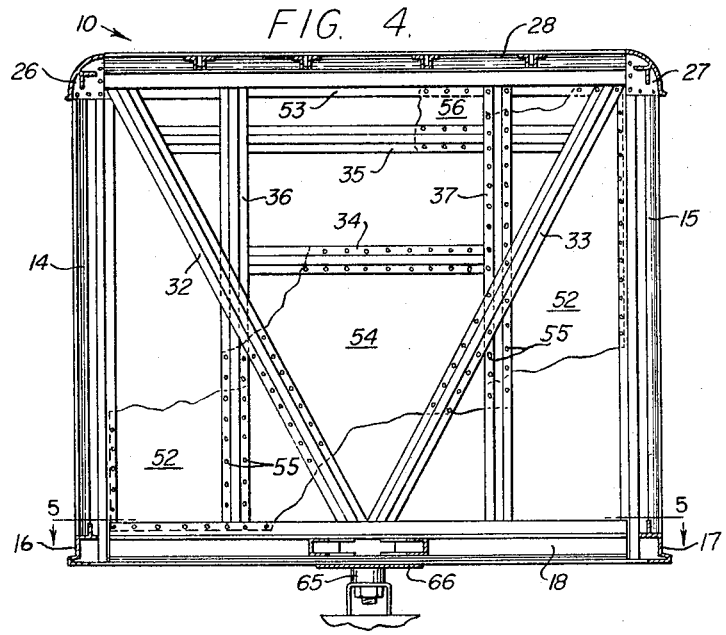
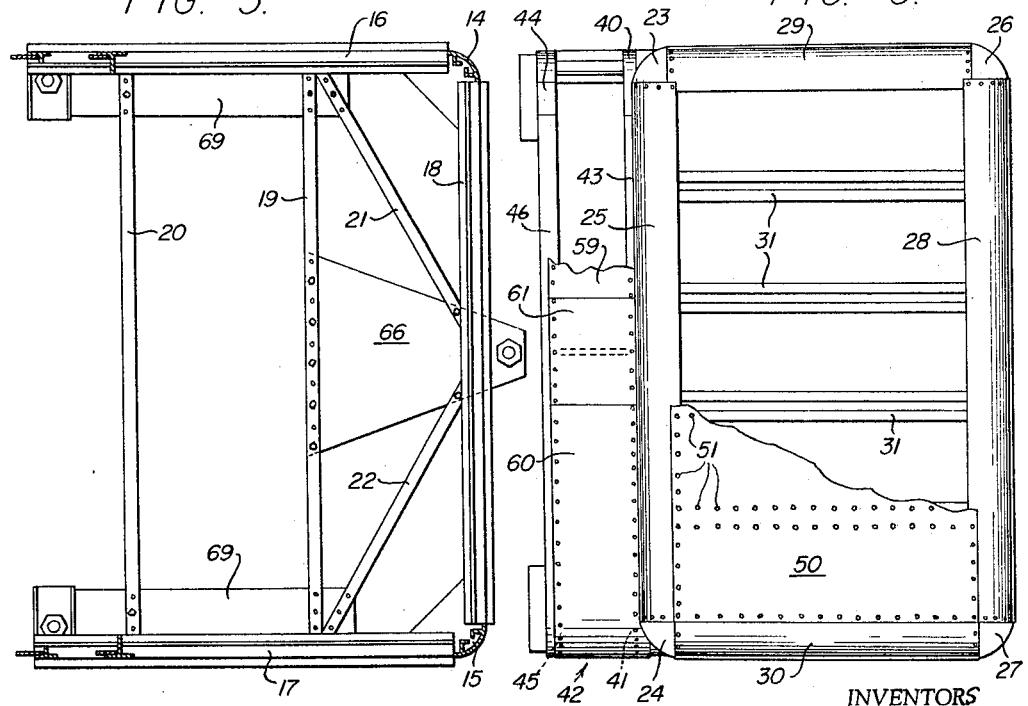
INVENTORS
GEORGE E. HAFER
CHARLES S. WILLIS
BY Mallinckrodt and Mallinckrodt
ATTORNEYS United States Patent Office 3,279,843
Patented Oct. 18, 1966

3,279,843
TRUCK CAB CONSTRUCTION
George E. Hafer and Charles S. Willis, Salt Lake City, Utah, assignors to Ibex Motor Truck Corp., Salt Lake City, Utah, a corporation of Utah
Filed June 18, 1964, Ser. No. 376,173
8 Claims. (Cl. 296—28)

This invention relates to truck cab constructions and is particularly concerned with the construction of cabs used on heavy-duty vehicles commonly employed for oil production, logging, power wire stringing, and other off-highway uses.

Rigorous demands are made on trucks used for these purposes, and the cabs must be strong enough to perform their assigned tasks and yet as light in weight as possible to insure that a maximum pay load can be transported with the power available.

In addition to the usual driver-sheltering function of a truck cab, the cabs of off-highway trucks are often used as working platforms from which winching and other operations are conducted, and they must be strong enough to withstand such use. Because of the uneven terrain encountered, an unusually large amount of lateral twisting, i.e. racking, of the frame and cab occurs. Thus, the cab must be so constructed that, while strong, it has sufficient built-in flexibility to prevent breaking of rigid members.

The remote areas in which such vehicles are generally employed further necessitate a truck cab construction that will allow repairs to be made in the field by inexperienced workmen using whatever limited equipment may be available to them.

In the making of the present invention a principal object was to provide a lightweight and easily-repaired truck cab, strong enough to withstand rigorous off-highway truck usage and yet sufficiently flexible to allow racking of the truck frame and cab without damage to rigid structural members.

Principal features of the invention for the accomplishment of this object are the provision of a riveted aluminum framework adapted to distribute and absorb stresses received at three suspension points, and an extremely sturdy cab top made up of a skin of sheet aluminum extending over and fixed to supporting braces which are connected to specially designed cast aluminum corner caps. Panels of sheet aluminum skin are placed over the remainder of the framework, except for the vehicle window and door areas, and the skin is riveted in place. The skin is of readily obtainable, standard, sheet aluminum, and the framework is made up largely of standard aluminum extrusions cut to desired length. Thus, the parts are easily obtained, and, because of the riveted construction, repairs can be made with simple tools.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

Figure 2:
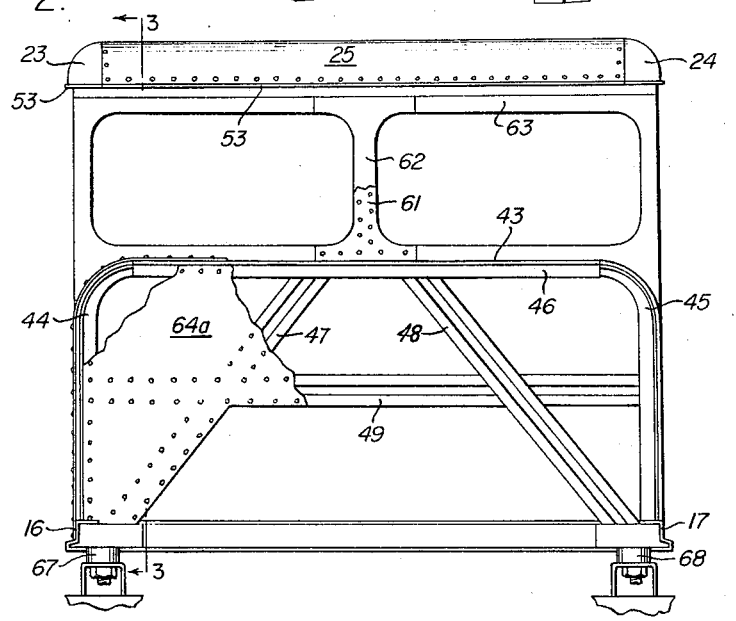
Figure 3:
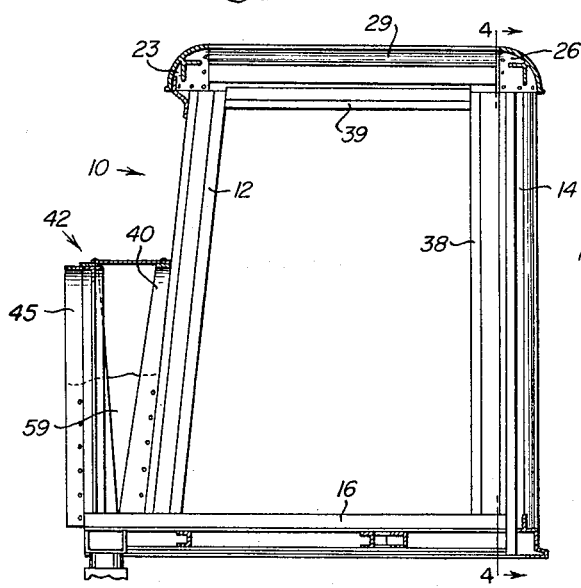

In the drawings:

FIG. 1 is a perspective view of the truck cab of the invention, with the truck frame shown fragmentarily;

FIG. 2, a front elevation of the cab, with the sheet aluminum skin shown fragmentarily;

FIG. 3, a vertical section taken on line 3—3 of FIG. 2;

FIG. 4, a similar view taken on line 4—4 of FIG. 3;

FIG. 5, a horizontal section taken on line 5—5 of FIG. 4; and

FIG. 6, a top plan view of the cab, with the sheet aluminum skin shown fragmentarily.

Referring now to the drawings:

The truck cab of the invention comprises an interior framework 10 made up primarily of standard aluminum extrusions and special cast aluminum corner caps, adapter posts and firewall posts, covered with one or more layers of aluminum sheet material that forms a skin 11 for the framework.

In the preferred form illustrated, framework 10 includes right and left, front, corner posts 12 and 13, respectively, and corresponding, right and left, rear posts 14 and 15, with the right corner posts being fixed to and carried by a lower bottom rail 16 and the left corner posts being carried by a similar bottom rail 17. Front corner posts 12 and 13 desirably each form an angle of approximately 83° with their respective lower bottom rail, and rear posts 14 and 15 are positioned at right angles to the bottom rails. The bottom rails extend beyond the front corner posts to provide support for the adapter posts and firewall posts, as will be further explained.

A lower rear brace 18, FIGS. 4 and 5, interconnects the bottoms of rear posts 14 and 15 and a pair of spaced steel floor braces 19 and 20 interconnect bottom rails 16 and 17.

Steel diagonal members 21 and 22 interconnect the ends of brace 19 and the mid-point of lower rear brace 18 and serve to distribute stress from the lower rear brace to the bottom rails.

A cast aluminum corner cap is provided on top of each corner post and the front caps 23 and 24, respectively mounted on front corner posts 12 and 13 are interconnected by a quarter-round front longeron 25. Similarly, rear caps 26 and 27 are connected by a quarter-round rear longeron 28, the right front and right rear caps are interconnected by a quarter-round right longeron 29, and the left front and left rear caps are connected by a quarter-round left longeron 30.

Additional spaced cross-braces 31 span the distance between the front and rear longerons and provide extra support for the sheet of aluminum placed as a skin on the top of the cab, as will become apparent.

Another pair of diagonal members 32 and 33 interconnect the midpoint of the lower rear brace with the ends of the right and left longerons such that stresses transmitted to the cab at the mid-point of the lower rear brace are distributed through the diagonal members to the side longerons, as well as to the bottom rails. Cross-members 34 and 35 connect the diagonal members 32 and 33 and also connect vertical braces 36 and 37 to provide framing for the rear window (not shown) of the truck and studding to which the sheets of aluminum comprising the cab skin are attached.

A vertical post 38, FIG. 3, is positioned adjacent each rear corner post between the upper and lower side braces, and a similar horizontal post 39 is connected to the top longerons between the front and rear corner posts to serve as the jamb for the truck door (not shown). The slanting front corner posts 12 and 13 serve as hinge posts for the doors and their straight, i.e. rectilinear, construction allows the use of a piano hinge (not shown) as supports along the full length of the doors.

With the exception of the corner caps, which are specially cast for this purpose, and those steel braces already identified, the framework thus far described is constructed of readily obtained aluminum extrusions having cross-sections as illustrated.

A pair of adaptor posts 40 and 41 are carried by the extensions of the bottom rails 16 and 17 respectively, and are positioned adjacent front corner posts 12 and 13. Adaptor posts 40 and 41 are specially cast to extend upwardly from the lower side braces and to curve inwardly toward each other, thereby forming side radii of a cowling 42 and the lower part of a windshield frame. An extruded aluminum bridge member 43 interconnects the upper ends of the two adaptor posts and completes the frames of the lower windshield and the cowling.

Another pair of castings 44 and 45 are carried by the extension ends of bottom rails 16 and 17. Castings 44 and 45 constitute firewall posts extending upwardly from the bottom rails and curving inwardly toward each other such that their uppermost extremities are positioned just below and spaced from the adaptor posts 40 and 41.

A bridging member 46 interconnects the upper ends of firewall posts 44 and 45 and a pair of diagonals 47 and 48 each extend between the end of one bottom rail brace and a point intermediate the length of bridging member 46. A cross-member 49 extends between the vertical portions of the firewall posts and serves to interconnect diagonals 47 and 48. Cross-member 49, in addition to reinforcing the structure and serving as a stud for attachment of the skin also cooperates with diagonals 47 and 48 to define a motor opening into the cab.

Rivets are used to interconnect all framework members.

A single sheet 50, FIG. 6, of aluminum slightly overlaps each of the longerons and is riveted to them. Additional rivets 51 secure sheet 50 to cross-braces 31.

Aluminum sheets 52, FIG. 4, fixed along one edge to the rear corner posts and overlapping vertical braces 36 and 37 cover part of the back of the cab. The top edges of sheets 52 extend beneath the driprail 53 of the rear longeron 28 and the bottom edges overlap the lower rear brace 18. Sheets 52 are riveted top and bottom.

Another sheet of aluminum 54 overlaps both vertical braces 36 and 37 and the edges of sheets 42 and has its top edge riveted to cross-member 34 and its lower edge overlapping and similarly connected to lower rear brace 18.

A double row of rivets 55 is used to secure the edges of sheets 52 and sheet 54 to each of the vertical braces 36 and 37.

Another sheet of aluminum 56 has its top edge extending beneath the drip rail 53 of rear longeron 28 and is riveted to the longeron. Its bottom edge overlaps and is riveted to cross-member 35 and its side margins overlap the edges of sheets 52 and the vertical braces 36 and 37 and are riveted thereto with a double row of rivets. The opening formed between the aluminum sheets 52, 54, and 56 serves as a rear window opening for the cab.

Two strips of sheet aluminum material are riveted on each side of the cab, with one strip 57 serving as a facing for the front post and the other strip 58 covering the rear corner post and the adjacent vertical door jamb post 38.

A pair of aluminum strips 59 and 60, FIG. 6, cover the adaptor posts and a portion of the firewall posts and form the cowling 42 for the cab. These strips overlap the bottom rails slightly, are riveted thereto, and are positioned to abut at the center of bridging members 43 and 46. They are riveted to the adaptor and firewall posts and to the bridging members. Since the firewall posts do not extend upwardly as far as the adaptor posts the cowling formed by the posts and the aluminum skin slopes slightly away from the cab, thus giving a smooth transition between the cab and a vehicle hood, not shown.

A central cover member 61, FIGS. 2 and 6, covers the joint between strips 59 and 60 and extends upwardly to cover and strengthen a center post 62 of the truck windshield. Both cover member 61 and center post 62 cover a windshield frame 63 riveted to front longeron 25, front corner posts 23 and 24, adaptor posts 40 and 41, and bridge member 43.

Cover member 61 and center post 62 are riveted in place and the cover member is riveted to the cowling bridge members 43 and 46 to hide the opening between strips 59 and 60 and to reinforce the cowling so that it can support a heavy truck radiator, not shown, connected at the ends of tie rods 64, shown fragmentarily.

The firewall is covered with a sheet of aluminum 64a, with the opening below cross-member 49, and between diagonals 47 and 48 being left open so that the firewall can straddle the motor, or transmission, housing, as required.

Three cushion mountings are provided the cab for attachment to the truck frame. These include a rear resilient mounting 65 positioned slightly behind and beneath the mid-point of rear brace 18 and carried by a steel plate 66 riveted and bolted to diagonals 21 and 22, floor brace 19, and lower rear brace 18. The steel plate distributes stresses developing at the mounting through lower rear brace 18, the diagonals, and floor brace 19 to the entire framework.

The two front resilient mountings 67 and 68 are each mounted beneath a steel plate 69, which is riveted and bolted to diagonals 21 and 22, braces 19 and 20, a bottom rail, and a front corner post, such that stresses developing at these mountings are also distributed throughout the entire framework.

The use of cast corner caps, top longerons and cross-braces interconnecting the front and rear longerons, covered with aluminum sheeting provides a strong cab top that will withstand even the weight of persons working thereon, and because of the aluminum construction the necessary strength is achieved without making the cab unduly heavy.

The use of three steel plates to which resilient mountings are attached and diagonal members to distribute stresses throughout the entire cab framework allows lightweight materials to be used in the construction of the cab, without sacrificing cab strength, and the riveted connections between the framework members themselves, and between the framework members and the skin, make the cab sufficiently flexible that racking of the cab and frame will not break rigid members.

The special adaptor and firewall posts allow the cowling to be built as an integral unit with the truck cab, and, with the exception of the corner caps and the adaptor and firewall posts, each component part of the cab is of standard construction, readily available, and easily replaced without the use of welding or other special equipment.

Whereas there is here illustrated and specifically described a certain preferred construction of apparatus which is presently regarded as the best mode of carrying out the invention, it should be understood that various changes may be made and other construction adopted without departing from the inventive subject matter particularly pointed out and claimed herebelow.

Although aluminum and other particular materials have been specified throughout because they are presently preferred, other materials having generally similar characteristics can be used if desired likewise, although it is preferable that interconnecting members be secured by riveting to enable convenient repair in the field, other advantages of the invention will be achieved even though some other form of securement is utilized.

We claim:

1. A truck cab including a framework comprising extruded aluminum top longerons; aluminum corner caps interconnecting said top longerons; a plurality of extruded aluminum braces interconnecting a pair of said top longerons that are oppositely spaced; front and rear extruded aluminum corner posts supporting said corner caps; a pair of oppositely positioned, extruded aluminum bottom rails supporting said corner posts; an extruded aluminum lower rear brace interconnecting the rear corner posts and the bottom rails; a floor brace extending parallel to the lower rear brace and interconnecting the bottom rails; a pair of extruded aluminum diagonal members interconnecting the mid-point of said lower rear brace and the ends of the longeron interconnecting the corner caps on the rear corner posts; and another pair of extruded aluminum diagonal members interconnecting the mid-point of the lower rear brace and the ends of the floor brace.

2. A truck cab as in claim 1, further including a covering for the framework, said covering being provided with door and window openings and including a sheet of aluminum riveted along its marginal edges to the top longerons and corner caps and riveted to the braces to provide a strong top for the cab.

3. A truck cab as in claim 2, wherein said bottom rails extend beyond the front corner posts; and wherein there is included a cowling supported on the extensions of said bottom rails.

4. A truck cab as in claim 3, wherein said cowling includes an aluminum adaptor post and an aluminum firewall post carried by the extension of each bottom rail; and wherein an aluminum covering extends over and interconnects said adaptor and firewall posts.

5. A truck cab as in claim 4, wherein cushion means are positioned beneath and carried by the extension of each bottom rail; and another cushion means is carried by and centrally of the lower rear brace.

6. A truck cab, comprising right and left front corner posts; right and left rear corner posts; a corner cap positioned on and fixed to each corner post; right and left longerons interconnecting the right and left front corner caps with the right and left rear corner caps respectively; a rear longeron interconnecting the right and left rear corner caps; a front longeron interconnecting the right and left front corner caps; a plurality of spaced parallel braces interconnecting the front and rear longerons; a pair of bottom rails interconnecting the right and left front corner posts and the right and left rear corner posts, respectively, at their ends opposite the corner caps, said bottom rails extending beyond the front corner posts; a lower rear brace interconnecting the rear corner posts at their ends opposite the corner caps; a plurality of floor braces rigidly interconnecting the bottom rails; a pair of diagonal members interconnecting the lower rear brace midway of its length with the ends of the adjacent floor brace which interconnects the bottom rails; a second pair of diagonal members interconnecting the lower rear brace midway of its length with the ends of the rear longeron; a pair of horizontal cross-members rigidly interconnecting said second pair of diagonals intermediate their lengths; a pair of spaced vertical members rigidly interconnecting the upper and lower rear braces and the horizontal cross-members and forming with said horizontal cross-members a rear window opening; a pair of adaptor posts, one fixed to the extension of each of said bottom rails beyond said front corner posts and positioned adjacent a corner post, said adaptor posts extending upwardly from the bottom rails and curving toward each other at a point intermediate the length of the left and right corner posts; a bridge member interconnecting the curved ends of the adaptor posts; a pair of firewall posts, one fixed to each extension of said bottom rails at the side of said adaptor posts opposite the left and right front corner posts, said firewall posts extending upwardly from the bottom rails and curving toward each other at a point just below and spaced from the uppermost level of the adaptor posts; a bridging member interconnecting the curved ends of the firewall posts; a pair of diagonals connected to said firewall posts at their junction with the bottom rails and to the bridging member intermediate its length; an aluminum covering interconnecting said adaptor posts and said firewall posts; another aluminum covering interconnecting the corner caps and the longerons; additional aluminum covering interconnecting the rear longeron, the right and left rear corner posts, and the upper one of the pair of parallel cross-members; yet another aluminum covering interconnecting the lower rear brace, the right and left rear corner posts, and the lower one of the pair of parallel cross-members; still other aluminum coverings extending between the right rear corner post and its adjacent spaced vertical member and the left rear corner post and its adjacent spaced vertical member; rear cushion mounting means fixed beneath and behind said lower rear brace, midway of its length; and front cushion mounting means fixed beneath the extensions of the bottom rails and the adaptor posts.

7. A truck cab according to claim 6, wherein said rear cushion mounting means includes a rigid plate fixed to the brace connecting the bottom rails nearest the lower rear brace, the diagonal members connected to the brace, and the lower rear brace, and a resilient pad carried beneath said plate; and said front cushion means each include a rigid plate fixed to a front corner post, a bottom rail, the braces interconnecting the bottom rails, and a diagonal member connected to the lower rear brace and the adjacent brace interconnecting the bottom rails, and a resilient pad carried by said plate.

8. A truck cab as in claim 7 wherein all connections are riveted.

References Cited by the Examiner

UNITED STATES PATENTS

| 2,263,510 | 11/1941 | Lindsay. | |
| 2,540,214 | 2/1951 | Pope et al. | 296—28 |
| 2,812,973 | 11/1957 | Pritchard | 296—28 |
| 3,055,699 | 9/1962 | May | 296—28 |

FOREIGN PATENTS

| 732,191 | 6/1955 | Great Britain. |

BENJAMIN HERSH, *Primary Examiner.*

A. HARRY LEVY, *Examiner.*

E. E. PORTER, *Assistant Examiner.*